United States Patent
Lee et al.

(10) Patent No.: US 6,700,858 B2
(45) Date of Patent: Mar. 2, 2004

(54) METHOD AND APPARATUS FOR PARALLEL READOUT AND CORRELATION OF DATA ON OPTICAL DISKS

(75) Inventors: John N. Lee, Silver Spring, MD (US); Robert L. Denningham, Lanham, MD (US); Ray B. Brown, Jr., Upper Marlboro, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/284,393

(22) Filed: Oct. 31, 2002

(65) Prior Publication Data

US 2003/0058775 A1 Mar. 27, 2003

Related U.S. Application Data

(63) Continuation of application No. 09/921,829, filed on Jan. 19, 2001, now Pat. No. 6,501,724.

(51) Int. Cl.[7] .................................................. G11B 7/00
(52) U.S. Cl. ............................... 369/124.02; 369/124.04
(58) Field of Search ....................... 369/124.02, 124.03, 369/124.04, 124.09, 44.26, 44.37, 44.38, 103, 95

(56) References Cited

U.S. PATENT DOCUMENTS

| 4,283,777 A | * | 8/1981 | Curry et al. ............... 369/44.37 |
| 5,315,575 A | * | 5/1994 | Akatsuka ............... 369/112.02 |
| 6,501,724 B2 | * | 12/2002 | Lee et al. ............... 369/124.02 |

FOREIGN PATENT DOCUMENTS

JP          04337530 A     * 11/1992

\* cited by examiner

*Primary Examiner*—Thang V. Tran
(74) *Attorney, Agent, or Firm*—John J. Karasek; John Gladstone Mills, III

(57) ABSTRACT

A light beam encoded with data simultaneously reads out data stored in tracks on an optical disk and produces a reflected beam directed to a detector array. The data stored on the optical disk and the encoded data may be components of vector arrays. As the light beam illuminates the rotating optical disk, the data stored on the disk is multiplied by the encoded data. The products of the multiplication are encoded in the reflected beam. A multiplicity of data is read out in parallel from the optical disk and simultaneously correlated with the encoded data. This comparison or correlation operation is performed on digitally encoded data utilizing convolution, or with analog encoding. The present invention can be utilized in pattern matching.

9 Claims, 10 Drawing Sheets

METHOD AND APPARATUS FOR PARALLEL READOUT AND CORRELATION OF DATA ON OPTICAL DISKS

This application is a continuation of application Ser. No. 09/921,829, filed Jan. 19, 2001, now U.S. Pat. No. 6,501,724.

BACKGROUND OF THE INVENTION

1. Field of the Invention

The present invention relates generally to a method and apparatus for simultaneous parallel readout and correlation of data on an optical disk and, more particularly, to a method and apparatus for addressing or illuminating multiple disk tracks and bits within each track containing data on the optical disk with a light beam encoded with external data, and for summing a light beam reflected from the disk, which reflected light beam represents the product of the external data and disk data.

2. Description of the Related Art

Optical disk memory is coming into very widespread usage. The advantages include large storage capacity, compatibility with existing memory access systems, and a remote or non-contact sensing head. Data is stored as digital bits ("1" or "0"), using mechanisms such as thermal ablation, phase change, and reversal of a domain in a magneto-optic medium. Applications include commercial audio and video, databases, and computer memory. Developments now allow such optical disks to be either read-only (information pre-stored), write-once and read many times (WORM type), and erasable/rewritable.

An important additional advantage of optical disk memory over a magnetic disk is the potential for optical readout of many channels of information in parallel. Present readouts are single channel and position the optical readout beam using mechanical-type mechanisms used in magnetic disk memory devices. The access time is slower and readout time is no faster than for corresponding magnetic media; these are commonly perceived disadvantages of optical disks.

Massively parallel optical readout could overcome these disadvantages. However, two obstacles present themselves. The first problem is that the rate of data readout would be increased by a factor equal to the number of parallel readout channels; this effective rate would presumably be a large multiple of the single-head readout rate (typically 25 Mbits/sec), which can cause data-rate overload (or mismatch) by the receiving device (e.g., the input to a computer or signal processing device) unless some measures are taken.

The second problem is that data encoding schemes and data formats for optical disks do not allow easy large-scale parallel readout using a single large-area optical beam. If multiple read heads are used, there is a practical limit on the order of ten channels, as well as a need to synchronize the multiple read heads. Therefore, there would be little advantage over a similar magnetic disk system. One scheme for overcoming this second problem is to store analog data on the optical disk using area modulation of a data cell with many binary bits to represent gray scale values. The disadvantage is loss of information capacity on a fixed-size optical disk. Moreover, this approach does not address the first problem of data-rate mismatch.

SUMMARY OF THE INVENTION

An object of the present invention is to perform a parallel optical readout of data from an optical disk without causing data-rate overload by the receiving device.

Another object of the present invention is the parallel readout of data stored on an optical disk using a single large area optical beam.

Another object of the present invention is to provide a system of correlating many channels of stored data with input data rapidly and accurately.

A further object of the present invention is the parallel readout of analog data stored on an optical disk using a radial beam.

The present invention involves rapidly searching data stored on an optical disk using optical readout to compare the stored data against external data encoded in a light beam projected onto the optical disk. The data stored on the optical disk and the external data may be vector arrays. Multiple bits of data are read out at the same time by a beam which illuminates plural tracks and plural bits within each track. The multiplicity of data bits read out in parallel from the optical disk are simultaneously compared (correlated) with the external data. Data is encoded onto the optical disk, preferably in the conventional binary form. The comparison or correlation operation is performed utilizing convolution. The present invention can be particularly utilized for pattern matching.

The above-mentioned and other objects and features of the present invention will become more apparent from the following description when read in conjunction with the accompanying drawings. However, the drawings and descriptions are merely illustrative in nature and not restrictive.

BRIEF DESCRIPTION OF THE DRAWINGS

FIG. 4A is a truth table useful in understanding the circuit diagram of FIG. 5;

DESCRIPTION OF THE PREFERRED EMBODIMENTS

Figure 1:
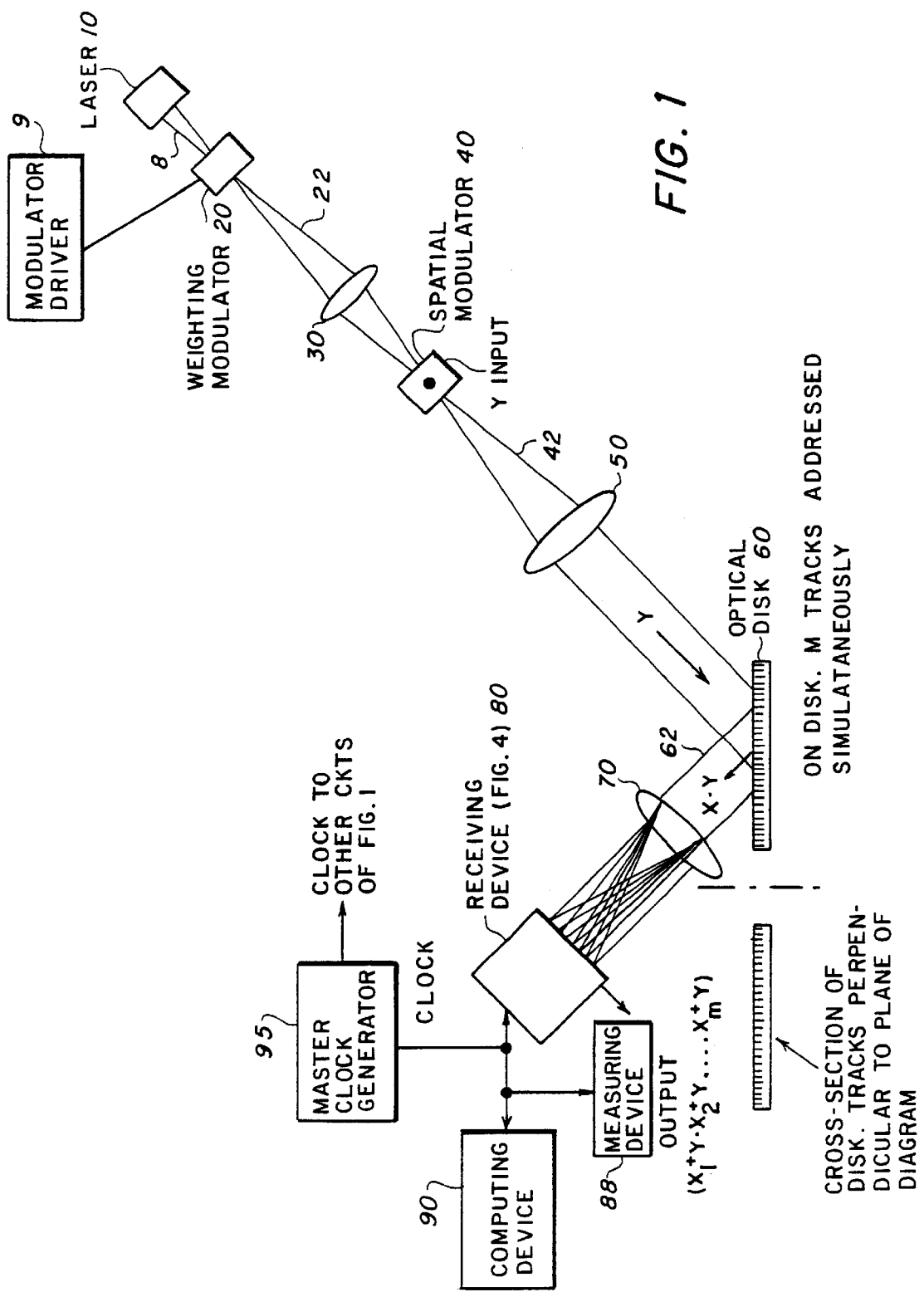
FIG. 1 is a diagram illustrating a first embodiment of the present invention having an encoded light beam projected onto an optical disk for parallel readout of data.

The present invention involves a pattern matching scheme, which correlates external data with data stored on an optical disk. Preferably, the data is stored on the optical disk as digital data; however, the data may also be stored as analog data. If the data is to be stored as digital data, the negative data can be converted to a two's compliment format before storing the data on the optical disk. However, it is preferable to store the data as digital data in its original format on the optical disk.

The pattern matching scheme of the present invention has many applications. For example, the digital data stored on the optical disk may represent models such as the modes or paths of sound waves travelling through water under a particular set of conditions. The set of conditions may include water temperature and salinity. The disk data may represent the vector components of a plurality of models of paths or modes. Preferably, each model for a path or mode is stored on a separate track. The external data may represent the vector components of an actual sound wave travelling through the water, which was sensed by a hydrophone or other sensing device. The external data is correlated with each model stored on the optical disk to determine which model most closely corresponds to the actual sensed external data. Such pattern matching allows the path of an incoming sound to be determined and the source of the sound to be located.

The pattern matching scheme of the present invention is not limited to correlation of sound waves with models of paths or modes. The external data may represent any pattern to be correlated with a plurality of sets of data representing patterns stored on an optical disk.

The pattern matching scheme preferably employs convolution to perform the actual correlation of the external data simultaneously with a set of models stored, preferably digitally, on an optical disk to determine which model most closely corresponds to the external data.

Before discussing the details of the present invention it is important to understand the fundamentals associated with data correlation. The product of two binary numbers, $x=(\alpha 1, \alpha 2, \ldots \alpha n)$ and $y=(\beta 1, \beta 2 \ldots \alpha n)$, can be generated by a convolution of the numbers, with the order of the significant bits of one of the numbers reversed. The product is a weighted sum of the convolution terms, given by the following expression:

$$\sum_{j=1}^{k=1,2\ldots n} 2^{2n-(k+1)}\alpha_j \beta_{k+1-j} + \sum_{j=k}^{n} 2^{2n-k}\alpha_j \beta_{k+n-j} \quad (1)$$

Where the total number of terms is 2n−1, the significance of the bits decreases with increasing subscript on $\alpha$ and $\beta$, i.e., subscript =1 labels the most significant bit and subscript =n labels the least significant bit, and the waiting coefficients are the powers of "2", which are determined by the number of tracks m and the number of bits in a set of data n stored in each track when the data is provided on tracks.

The conventional binary multiplication involved in convolution is cumbersome to perform. The data optically read is converted into electrical signals, which are multiplied using an electronic multiplier. This leads to severe limitations on the number of channels addressable in parallel. Thus, it is advantageous to generate analog results of convolution optically by using a method called digital multiplication by analog convolution (DMAC). Implementation of a DMAC algorithm for matrix multiplication has been previously reported (Ravindra A. Athale, Huy Q. Hoang and John N. Lee, "High Accuracy Matrix Multiplication with Magnetoptic Spatial Light Modulator", Soc. Photo-Inst. Eng., Vol. 431, pages 187–193(1983) incorporated by reference herein). The result of performing a DMAC operation is an analog number obtained by evaluating the power series sum of equation (1). If the binary numbers x and y are corresponding components of two vectors, X and Y, the analog product of Equation (1) is one component of the inner product of the vectors. The inner product of two complex vectors $X=X^R+iX^I$ and $Y=Y^R+iY^I$ is $$X \dagger Y = \sum_j X_j * Y_j = \sum_j (X^R jY^R j + X^I jY^I j) + \quad (2)$$

$$i\sum_j (X^R jY^I j - X^I jY^R j)$$

$$= Z^R + iZ^I,$$

where the dagger (†) signifies transpose and complex conjugation, the asterisk denotes inner-product multiplication, the subscript j labels the components in vector space, and R and I label the real and imaginary parts of X and Y respectively. Here the output of an inner product operation results in two quantities, $Z^R$ and $Z^I$, regardless of the number of vector components.

FIG. 1 shows a first embodiment of the present invention which utilizes DMAC. A laser (light) beam 8 generated by a laser 10 is focused by a lens (not shown) and passed through a conventional weighting or optical modulator 20 which is driven by a modulator driver 9 that produces a bit data stream that modulates the intensity of the beam in accordance with $2^p$ where p=0,1, . . . (2n−2). For example, if n=8 bits, p=0,1, . . . 14 and the modulation weights equal $2^0, 2^1, 2^2, \ldots 2^{14}$. The modulated beam 22 passes through at least one conventional focusing lens 30 and is applied to a second conventional modulator called a spatial modulator 40. An example of the conventional spatial modulator 40 is a Bragg cell. The spatial modulator 40 modulates the beam 22 according to input external data (Y-input), thereby producing a weight and input data modulated beam 42. The output of the spatial modulator 40 passes through at least one conventional lens 50 that spreads the beam into a trapezoidal shape. The trapezoidal shaped beam illuminates plural tracks and plural bits on each track of a rotating optical disk 60 (see FIG. 2).

The reflection of the trapezoidal beam from the optical disk 60, called a reflected beam 62, is the inner product of the input data and the data stored in the tracks (x*y, for each of m tracks). The reflected beam 62 is focused by at least one conventional lens 70 onto a receiving linear detector array such as a CCD array or photodetector array 81 (FIG. 4) contained in a receiving device 80. The photodetector array 81 has at least one light sensor, such as a photodetector, for each of the m tracks of data. The lens 70 essentially converts the reflected trapezoidal beam into a line beam or one dimensional beam that illuminates the detectors of the linear array. When the trapezoidal beam is reflected off the optical disk 60, the reflected beam 62 is the result of multiplying (the inner product) all of the data in each track by both the weighted bit data stream controlling the intensity of the trapezoidal beam and the input external data controlling the spatial modulation of the trapezoidal beam.

The inner products are accumulated by the photodetector array 81 (FIG. 4) and can be transmitted from the receiving device 80 to a computing device 90, such as a conventional computer, by way of a conventional current measuring device 88, to determine which of the tracks has the data having the highest correlation with the input external data.

An alternative method of performing the analog conversion operation without the conventional weighing modulator 20 is to apply the weighing coefficients of the convolution terms in Equation (1) at the photodetector array 81 (FIG. 4) with electronic amplifiers. This approach has the advantage of reducing problems of non-linearity and limited dynamic range of the modulator 20.

Figure 2:
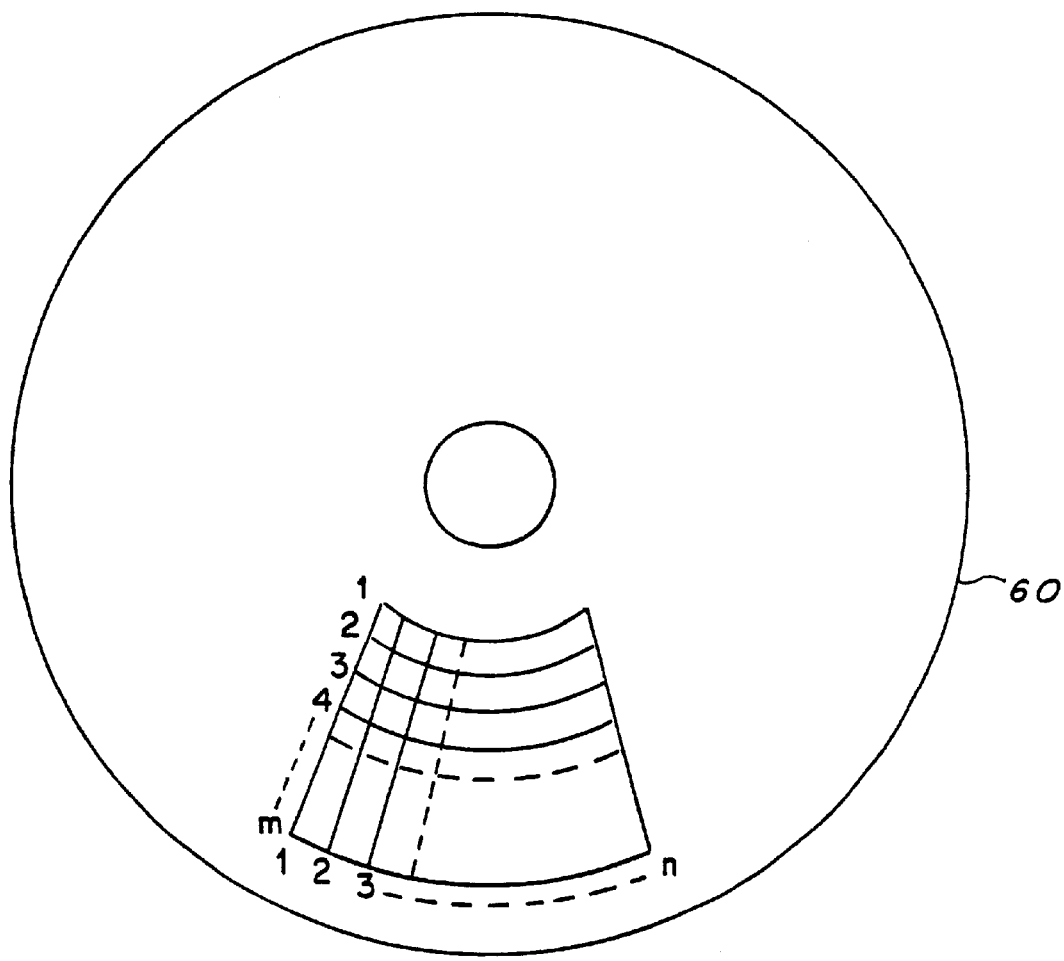
FIG. 2 is a plan view of an optical disk onto which a light beam encoded with data is projected in the present invention.

FIG. 2 shows the weight and spatially modulated beam illuminating a trapezoidal area on the optical disk 60. The optical disk 60 has m tracks, which are illuminated by the beam. In addition, n bits on each of the m tracks are illuminated as shown in FIG. 2.

The photodetector array 81 (FIG. 4) has m photodetectors. Each of the m photodetectors of the photodetector array 81 (FIG. 4) corresponds to a track and essentially receives the part of the reflected beam that is the product of the weighted input external data and the n bits on the corresponding track, which are illuminated by the trapezoidal beam. Eventually the data on each of the m tracks is read out as it rotates into and out of the trapezoidal beam as multiplied by the externally provided input data. This performs the multiplications of equation (1). A more detailed description of this will be described with respect to FIG. 3.

Figure 3:
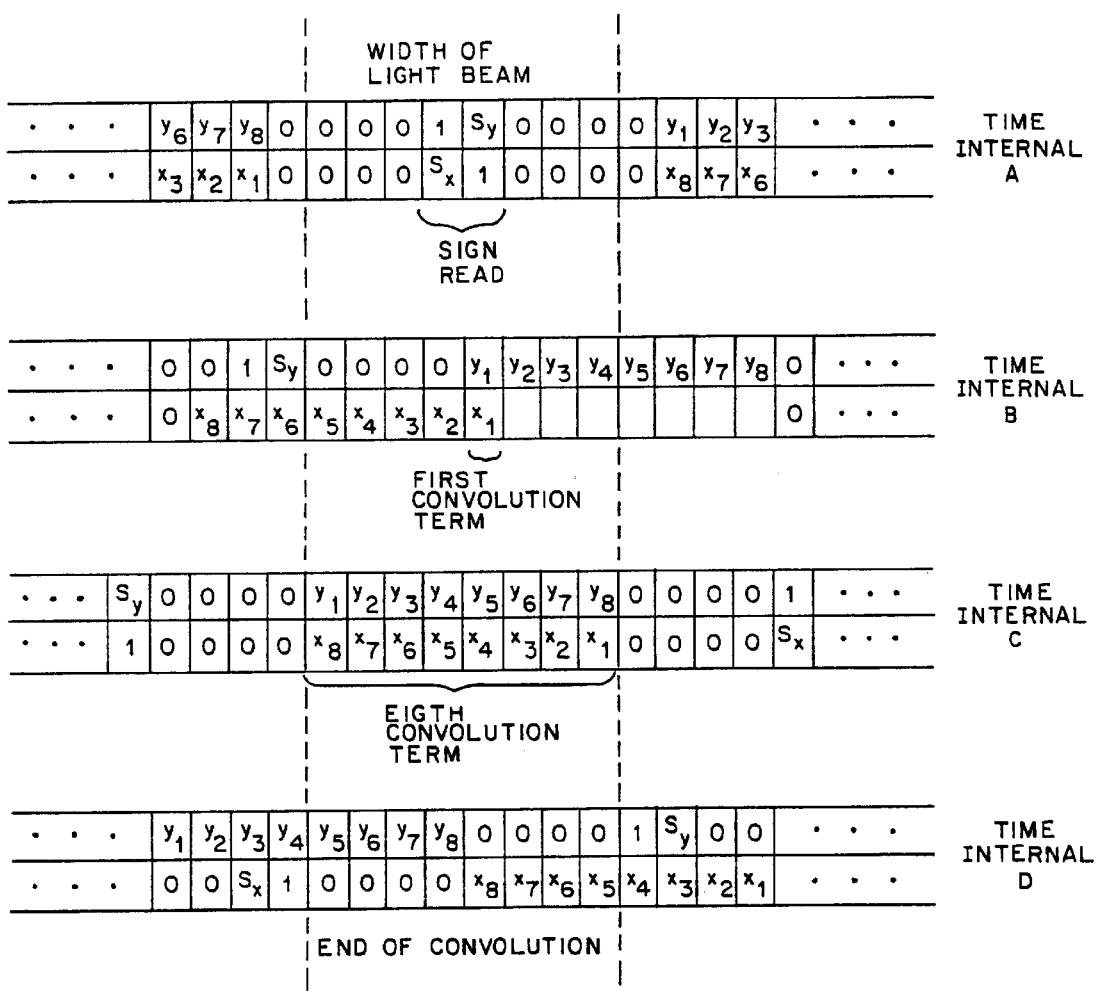
FIG. 3 is a diagram of four time slices showing the overlap of the projected light beam on the optical disk in the present invention.

FIG. 3 is an example of the convolution of one of the m tracks with the trapezoidal beam, actually with the portion of the trapezoidal beam illuminating that track. FIG. 3 shows the convolution of a set of data x ($x=x_1, x_2, x_3 \ldots x_n$) stored on an optical disk 60 in a track with a second set of input external data y ($y=y_1, y_2, y_3 \ldots y_n$) modulated onto a beam and illuminating n bits of the optical disk 60 in the track. In this example, n=8. The set of data $x_1, x_2, x_3 \ldots X_n$ may be referred to as the disk bits. The input external data $y_1, y_2, y_3 \ldots y_n$ may be referred to as the weighted input data bits. Each of the two sets of data, x and y, are associated with a sign bit $S_x$ and $S_y$, respectively. The total number of terms for the convolution is 2n-1 or in this example 15. However, the set of data x is merely one of the m tracks on the disk and the same operation is happening with respect to other tracks illuminated by the trapezoidal beam. That is, the trapezoidal beam having encoded the second set of input external data y is involved in the convolution of not only the set of data x on the one track shown in FIG. 3, but also in the convolution of each set of data stored on each of the m tracks simultaneously. FIG. 3 shows the convolution of the two 8-bit sets of data, x and y, at intervals from sign determination to the end of the convolution.

At time interval A the start bit, "1", and sign bit $S_y$ of the input external data are multiplied by the sign bit $S_x$ of the set of data on the track of the disk and the start bit "1", respectively during the reflection. The sign bit thus read out is used to route the output data as will be discussed in more detail later. At the time interval B, the weighted input data bits $y_2$, $y_3$ and $y_4$ are multiplied by zero, the disk bits $x_2, x_3, x_4$ and $x_5$ are multiplied by zero and the disk bit $x_1$ is multiplied by weighted input data bit $y_1$. That is, the corresponding photodetector for this track receives a reflected beam at the time interval B which is essentially $x_1*y_1$. At time interval C, the weighted input data bits $y_1, y_2, y_3 \ldots y_8$ are multiplied by the disk bits $x_8, x_7, x_6, \ldots x_1$, respectively. That is, the corresponding photodetector for this track receives a reflected beam at the time interval C which is essentially $y_1*x_8, y_2*x_7 \ldots y_8*x_1$. This is the midpoint of the convolution. At the time interval D, the weighted input data bits $y_5, Y_6, y_7$ and $y_8$ are multiplied by zero and the disk bits $x_8, x_7, x_6$ and $x_5$ are multiplied by zero. That is, time interval D represents the end of convolution. The total number of terms in this example is 2(8)−1=15.

Synchronization of the rotation of the optical disk and the modulation of beam may be achieved by using a clock from a master clock generator 95 (FIG. 1). For example, a pulse of light lasting 40 nanoseconds could be used to read the sign bits. The light beam may then be turned off until approximately 20 nanoseconds before the most significant bits of x and y are at their midpoint of convolution. Thereafter, it may be switched at the rate of 25 megahertz as it steps through the weighing coefficients of equation (1). In this example, the bandwidth of the spatial modulator should be at least 50 megahertz, corresponding to a rise time of less than 20 nanoseconds. This will produce a beam that reaches its power peak at each weighing step when the stream of bits in the light beam is aligned with all of the bits in the set of data on the disk, since the bits convolve at a rate of once every 40 nanoseconds.

The signal detected by the photodetector array 81 (FIG. 4) while the bits are misaligned will result in some smearing of the convolution products, and it may be necessary to overcome this by separating the bits by zeros, which will reduce by one-half the number of operations that can be stored on disk as well as reduce the processing rate. An alternative is to electronically switch the detectors on for a time much less than 20 nanoseconds near the midpoint of each weighing step to prevent the smearing of convolution products as they are received.

Figure 4:
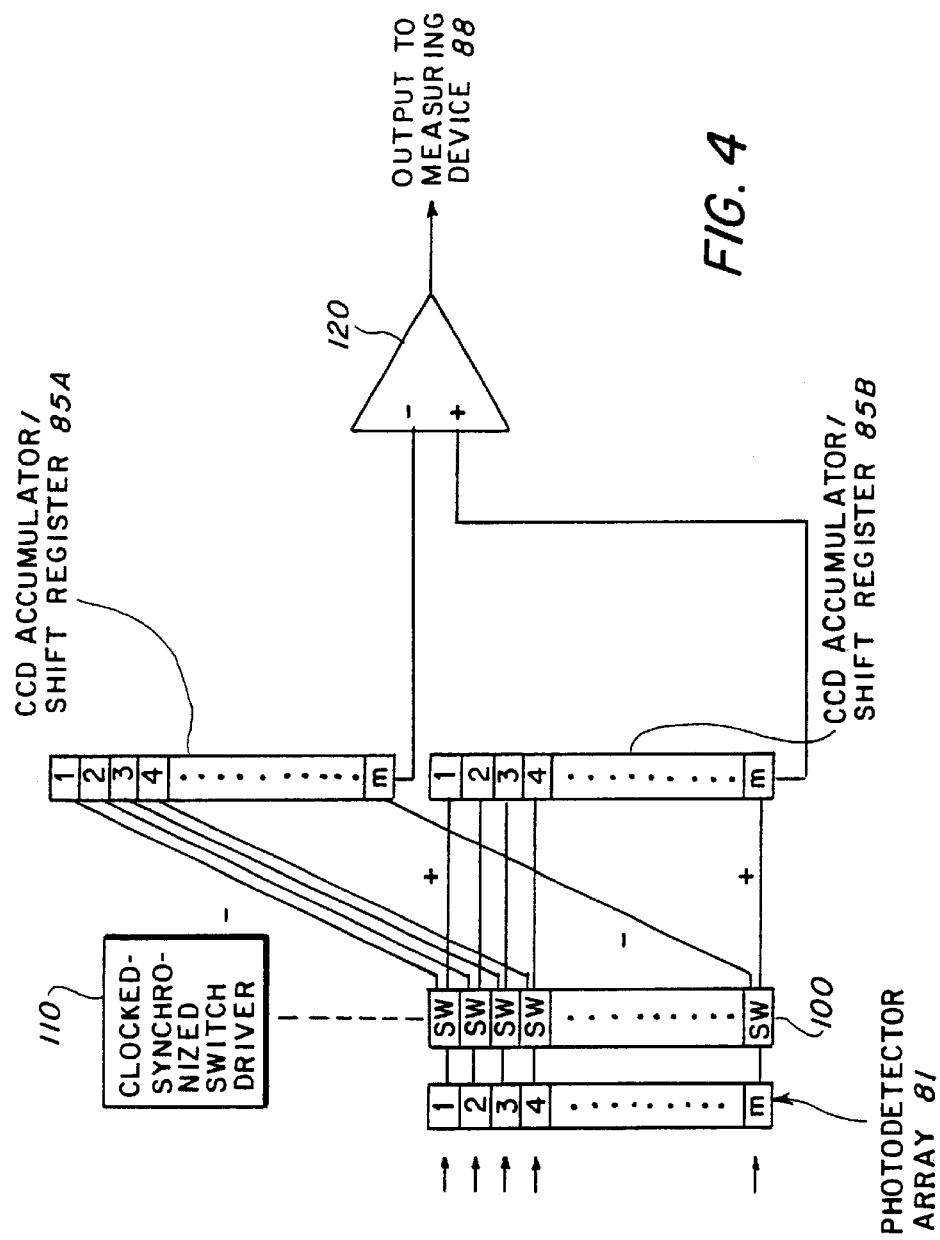
FIG. 4 is a diagram of the CCD array involved in the reception and analysis of the reflected light beam.

FIG. 4 shows the receiving device 80, comprised of the photodetector array 81 connected to a switch array 100, accumulator/shift registers 85A and 85B connected to the array 100, and an amplifier 120 connected to the accumulator/shift registers 85A and 85B. The truth table of FIG. 4A shows the possible output for each of the m switching circuits of switch array 100 and routs signs to either the positive CCD accumulator/shift register 85B or the negative CCD accumulator/shift register 85A. When the sign bits, $S_x$ and $S_y$ are read out in the photodetector array 81, for example, the photodetector corresponding to the track storing the set of data x and the sign bit $S_x$ provides a current based on the analog sum to a corresponding switching circuit in the switch array 100, which responds by selecting the negative CCD accumulator/shift register 85A or the positive CCD accumulator/shift register 85B depending upon the analog sum of the sign bits. As convolution terms of x and y, for example, are received by the corresponding photodetector of photodetector array 80, the photodetectors generate a current based upon each convolution term. This current is transmitted to the negative or positive CCD accumulator/shift register (85A–85B) depending upon switch selection. The selected CCD accumulator/shift register accumulates and stores the charge from the currents representing the convolution terms.

For example, if both $S_x$ and $S_y$ equal zero, the analog sum equals zero and the switch of the switch array 100, corresponding to the photodetector receiving the products of x*y, selects the positive CCD accumulator/shift register to store and accumulate the convolution terms. If $S_x$ equals zero and $S_y$ equals one, the analog sum equals one and the switch selects the negative CCD accumulation/shift register 85A to store and accumulate the convolution terms. If $S_x$ equals one and $S_y$ equals zero, the analog sum equals one and the switch selects the negative CCD accumulator/shift register 85A to store and accumulate the convolution terms. If both $S_x$ and $S_y$ equal one, the analog sum equals two and the switch selects the positive CCD accumulator/shift register 85A to store and accumulate the convolution terms. This is shown in the truth table in FIG. 4A.

The clocked-synchronized switch driver 110 drives the corresponding switch of the switch array 100 providing a path for the current from the corresponding photodetector of the photodetector array 80 to the corresponding accumulator/shift register (85A or 85B) as the convolution terms are received by the photodetector of the corresponding photodetector array 81.

When the convolution is completed, the accumulated charges are transmitted serially to an amplifier 120. If a particular accumulated charge is from the negative CCD accumulated/shift register 85A, the charge is transmitted to the inverting input of the amplifier 120 and if the charge is from the positive CCD accumulated/shift register 85B, the charge is transmitted to the noninverting input of the amplifier 120.

Although this example involved only one set of data x associated with a sign bit stored on one track, this operation applies to each set of data on each track. That is, the data from adjacent tracks can be switched to different registers.

The detection and accumulation of the convolution terms of one set of data with its associated sign bit on each track multiplied by the input external data with its associated sign bit occurs simultaneously and in the same manner as the above example. The sets of data associated with the track producing the greatest accumulation of charge in the CCD accumulator/shift registers 85A–85B, according to Equation (2), has the highest correlation with the input external data.

Figure 5:
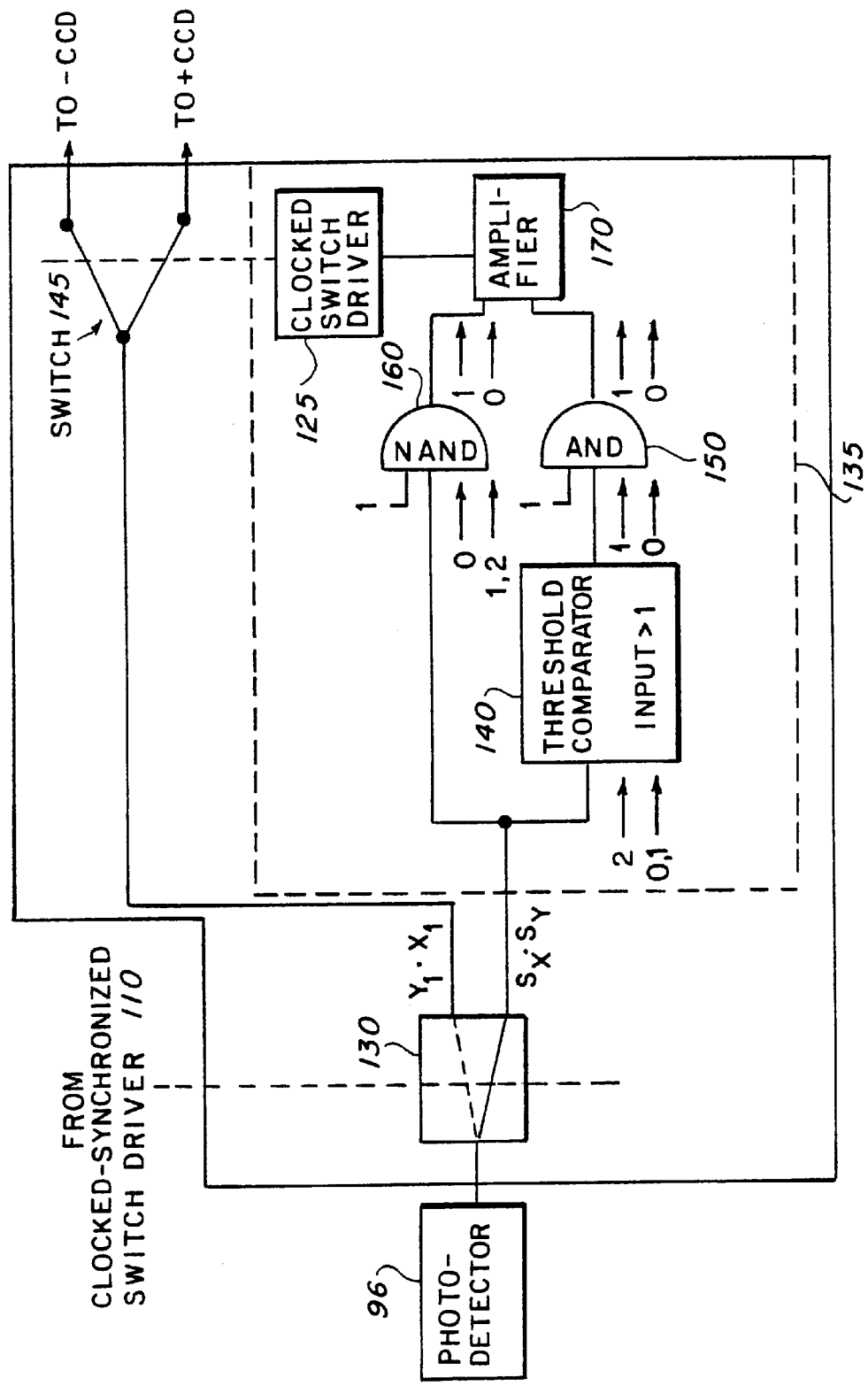
FIG. 5 is a diagram illustrating the switching mechanism for transmitting data to the appropriate CCD accumulator/shift register.

FIG. 5 shows the switching circuit for processing the sign signals for one photodetector element in the photodetector array 81. There is a signal processing circuit for each track. A photodetector 95 of the photodetector array 81, corresponding to the reflected beam encoded with the convolution terms of x*y, detects the analog sum of the sign bits as well as the convolution terms. The clocked-synchronized switch driver 110 is synchronized with the laser and rotation of the optical disk. When the analog sum of the sign bits $S_x$ and $S_y$ are detected, the clocked-synchronized switch driver 110 causes switching device 130 to connect the photodetector 95 to a sign bit determination circuit 135. When the photodetector is to detect the convolution terms, the clocked-synchronized switch driver 110 causes the switching device 130 to connect the convolution terms to a switch 105 of the switch array 100. The analog sum of the sign bits are received by a threshold comparator 140 and a NAND gate 160. One of the inputs of the NAND gate 160 is held at "1". If the analog sum is "0", the NAND gate 160 outputs "1" to an amplifier 170. If the analog sum is "1" or "2", the NAND gate 160 outputs a "0" to the amplifier 170.

If the threshold comparator 140 receives an analog sum of 2, the threshold comparator outputs a "1" to an AND gate 150. If the threshold comparator receives a "0" or a "1", the threshold comparator outputs "0".

The AND gate 150 has one input which is held at "1". If the AND gate 150 receives a "1", the AND gate 150 outputs a "1" to the amplifier 170. If the AND gate 150 receives a "0" from the threshold comparator 140, the AND gate 150 outputs a "0" to the amplifier 170.

The amplifier 170 amplifies the resulting signals, and outputs the information to the clocked switch driver 125. The clocked switch driver 125 drives the switch 105 to connect the photodetector 95 to the negative CCD accumulator/shift register 85A register or the positive CCD accumulator/shift register 85B depending on whether the resulting signal is a binary "1" or a binary "0", respectively.

In this example, it was assumed that the one set of data and a sign bit $S_x$ represented a number on a track. However, each of the tracks can have several sets of data with corresponding sign bits representing one model. The sign bits and convolution terms are read out in parallel (simultaneously). Each track has a corresponding photodetector to detect the reflection beam indicating the analog sum of the sign bits or the convolution terms of the sets of data representing the model stored in each track. The convolution terms are then stored and accumulated in a corresponding location of the CCD accumulator/shift register arrays (85A–85B).

Each model can be represented by a vector. For example, the model can be represented by a vector X in which one of the components is the set of data x having a corresponding sign bit $S_x$. Several sets of data, each having a corresponding sign bit, could represent vector components of vector X on the track. Each track would have several sets of data with a corresponding sign bits to represent a plurality of vectors representing a plurality of models. In this example, the input external data is a vector Y in which one of the components is y having a corresponding sign bit $S_y$. Each vector component of the input external vector Y would be multiplied by the corresponding vector component in each of the tracks simultaneously to produce the analog products of the vector components using the same apparatus and method as described in the previous example to implement Equation (1). The sum of the analog products produced by multiplication of vector components of the vectors X and Y represents the product of two vectors as in Equation (2). In the present example, each vector stored in each track is multiplied by input external vector Y to produce vector products. Concurrent serial readout of the CCD accumulator/shift register 85A–85B of the CCD array occurs after all of the inner products are calculated and accumulated in the shift register so that Equation (2) is implemented. The vector stored on the track on the disk which produces the highest current when multiplied with the input external vector, has the highest correlation with the input external vector.

Figure 6:
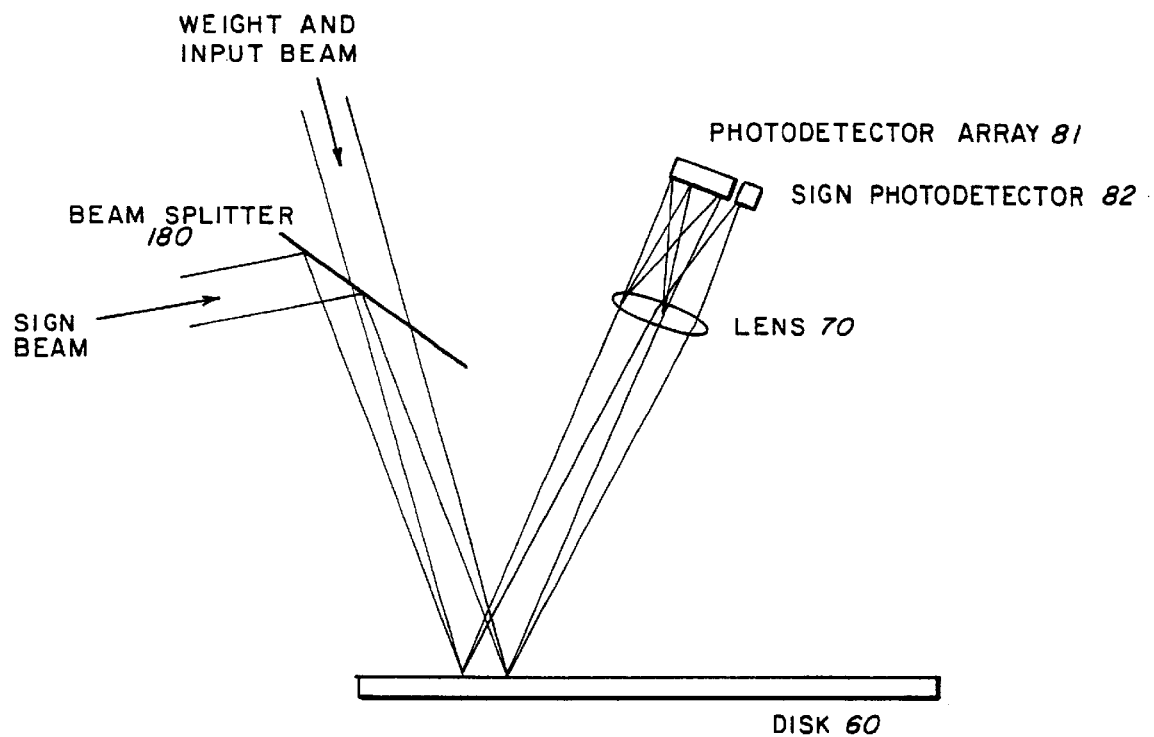
FIG. 6 is a diagram illustrating a second embodiment of the present invention having an encoded radial sign light beam projected onto an optical disk for parallel readout of sign bits and having an encoded trapezoidal data light beam projected onto the optical disk for parallel readout of data.

FIG. 6 shows a second embodiment of the present invention, which has the advantage of improved utilization of the storage density capability of the optical disk 60.

The weight and modulated input beam is generated in the same manner as in the first embodiment of the present invention. However, the weight and input data modulated beam does not have a sign bit. A separate modulated sign beam, which is modulated based on the sign bit of the external data, is used to read out the sign bit of each set of data on each of the m tracks. The sign beam in this case is essentially a radial beam or one dimensional beam rather than a two dimensional trapezoidal beam.

The sign beam encoded with the sign bit is preferably offset by a small angle from the optic axis of the weight and input data modulated beam. The optic axis of the sign beam is brought into coincidence with that of the weight and input data modulated beam by a beam splitter 180. The sign beam is directed onto a sign photodetector 82 located near the end of the photodetector array 81. The transmission of the beam splitter 180 can be chosen higher than its reflection to conserve signal beam power, since the power available in the laser may be a limiting constraint; a higher power diode laser can be used to replace the sign beam power lost at the beam splitter 180. A more detailed description of the operation of the second embodiment will be described with respect to FIG. 7.

Figure 7:
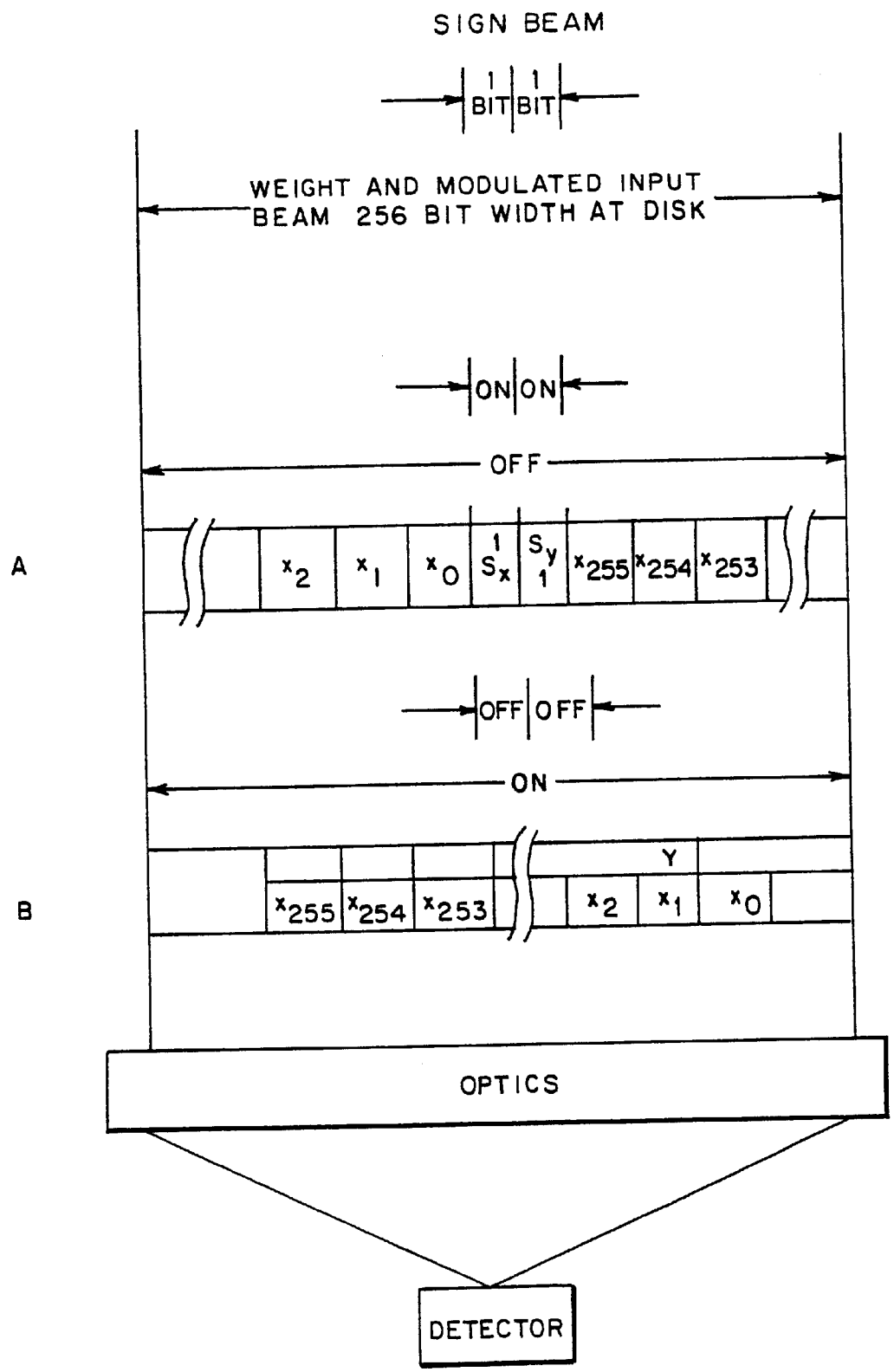
FIG. 7 is a diagram of two time slices showing the projected radial sign light beam on the optical disk and the projected data light beam on the optical disk in the second embodiment of the present invention.

FIG. 7 is an example of the convolution of one of the m tracks with the two beams shown in FIG. 6. The components of vector X are stored as sets of data on one of m tracks. Each set of data has a corresponding sign bit. The components of vector Y are encoded onto the weight and input data modulated beam, which is a trapezoidal beam. As in the first embodiment, the trapezoidal beam having the encoded input external data, is involved not only in the convolution of the plurality of sets of data on the one track shown in FIG. 7, but also in the convolution of each of the sets of data stored on each of the m tracks.

The synchronization of the rotation of the optical disk and the two beams is achieved by using clocks from master clock generator 95 to perform the reading out of the sign bits and the convolution of the components.

FIG. 7 shows two time intervals, A and B. At time interval A, the sign beam is turned ON and the weight and modulated input beam is turned OFF. The sign beam reads out the analog sum of the sign bits such as $S_x$ and $S_y$. The start bit, "1" and the sign bit $S_y$ of the input data are multiplied by the sign bit of the disk data $S_x$ on the track of the disk and the start bit "1", respectively.

At the time interval B, the sign beam is turned OFF and the weight and modulated input beam is turned ON. At time interval B, the corresponding photodetector for this track receives a reflected beam and produces a current based on the reflection beam. As the disk rotates, all of the convolution terms of all of the components of the vector of the track shown in FIG. 7 are read out and summed to produce currents, which are accumulated and stored in the same manner as described in the first embodiment. The vector components on each track are simultaneously multiplied and summed in the same manner as described in the present example. As in the first embodiment, the vector components stored on the track, which produce the highest current when multiplied by the input external vector, has the highest correlation with the input external vector.

In the first two embodiments of FIGS. 1 and 6, the models (data representing the signal being compared) have been stored circumferentially. However, the data can be stored on an optical disk with the predominant dimension across-track or radially as in the third embodiment discussed below. The optical disk can also be divided into groups of tracks, wherein each group of tracks is called a supertrack and contains data representing one model. Preferably there are 512 tracks in a supertrack. In such a situation, data is stored both radially and circumferentially. Each supertrack has radial stripes, which cross all the tracks in the supertrack. Each stripe is formed by a bit on each track of the supertrack. If there are 512 tracks in a supertrack, for example, the length of the radial stripe is 512 bits. A gray scale data representation may be obtained by changing the bit configuration of a radial stripe. The rate at which the models are read out decreases relative to the first two embodiments. The fastest readout rate of the third embodiment occurs when each model is distributed along one supertrack. Each model again may represent a vector. The amplitude and phase of each vector may be encoded in separate supertracks.

Figure 8:
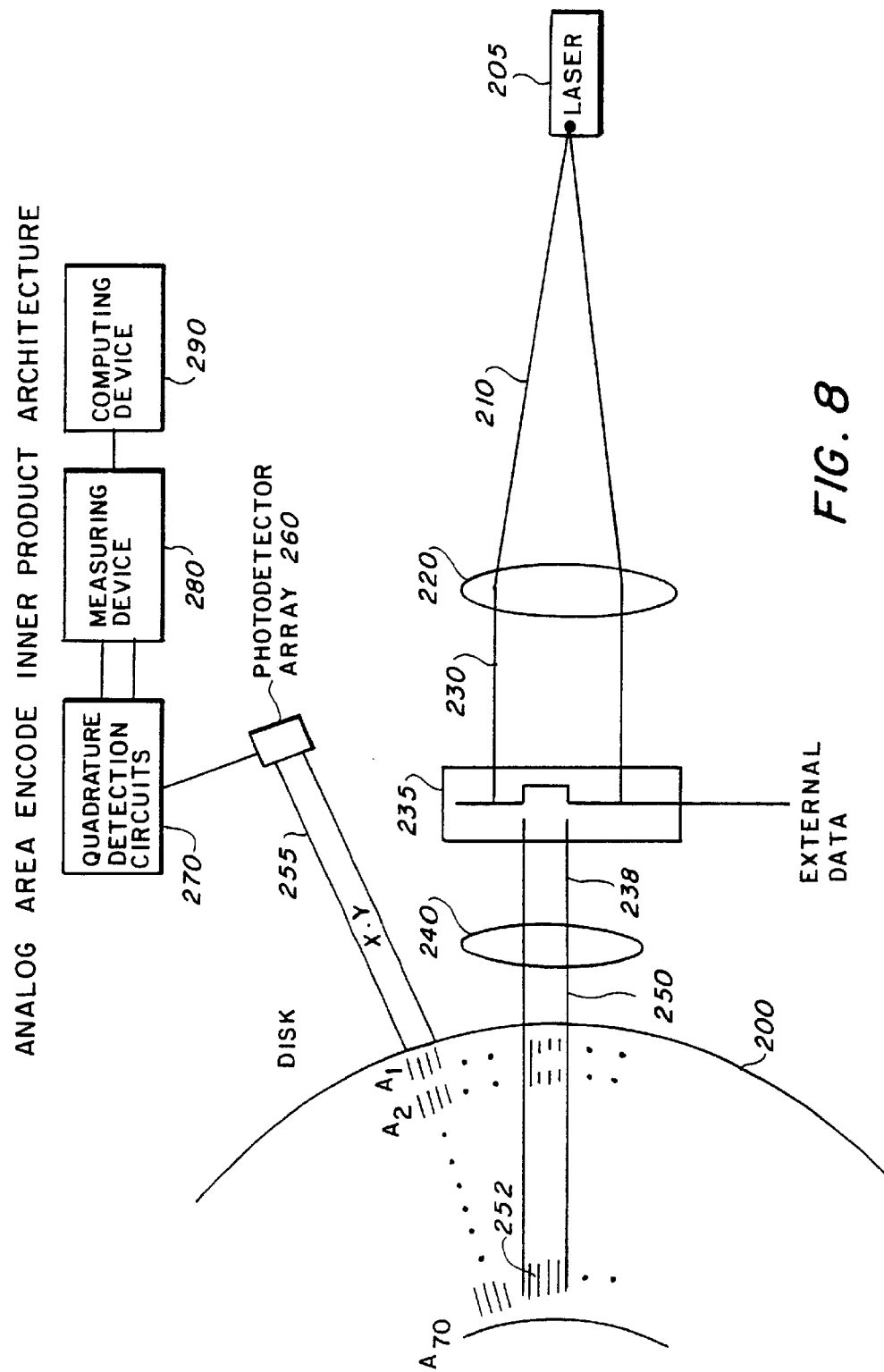
FIG. 8 is a diagram illustrating a third embodiment of the present invention having an encoded light beam projected onto an optical disk for parallel readout of data.

FIG. 8 shows a third embodiment of the present invention reading out models or patterns, such as $A_{70}$, stored in a radial direction on super tracks of an optical disk 200. The model may be a complex vector X. A laser beam generator 205 generates a laser beam 210, which is focussed by lens 220 to produce a focused laser beam 230. A spatial modulator 235, such as a Bragg cell, receives the beam 230 as well as input external data, such as a complex vector Y representing a pattern or model. The spatial modulator 235 modulates the beam 230 based on the input external data to produce an input modulated beam 238 or point beam. The point beam 238 is spread into the radial beam 250 by a lens 240 and onto the optical disk 200 to simultaneously illuminate at least one radial stripe, such as radial stripe 252, on all of the supertracks. However, several radial stripes are usually illuminated as shown in FIG. 8. The reflection of the radial beam 250 from the disk, called a reflected beam 255 carries the data products (convolution terms) of the input external data and the data stored on each supertrack of the optical disk 220. The reflected beam 255 is received by a detection array, such as photodetector array 260, which generates currents for the super track based on the data products encoded in the reflection beam 255. The current is output continuously from each element of the photodetector array 260 to quadrature detection circuits 270, which separate the AC component from the DC component of the currents and then separate the AC components into real and imaginary components for each supertrack. The quadrature detection circuits 270 are well known circuits.

The real and imaginary components of the currents are continuously transmitted to a measuring device 280 to determine a value for each the currents produced by the data products encoded in the reflection beam 255. These values are then transmitted to a computing device 290 which determines which of the supertracks has the highest correlation with the external data.

A more detailed description of this will be described by way of example in reference to FIGS. 8–10.

First, it is necessary to describe how the amplitude and phase of the complex vector X is stored on a supertrack, such as $A_{70}$, of rotating optical disk 200 as disk data. The complex vector Y represents an input external data modulated radial beam 250. When the beam 250 encoded with the vector Y traverses the disk data in the super track $A_{70}$ on a rotating optical disk 200, the disk data are treated as a signal on a carrier having an amplitude and phase. In this manner complex numbers can be encoded on the optical disk 200, such as the vector X, which represents for example an 8-bit complex number. The complex vector X on a carrier of radian frequency $\omega$ (frequency of rotation of the optical disk 200) has a vector component $X \exp(i\omega t)$, where $X = x \exp(i\theta)$, $$x=\sqrt{(X^R)^2+(X^I)^2}, \ \Theta=\tan^{-1}(X^I/X^R).$$

Encoded on the disk is A as disk data, which is the real part of the signal in supertrack $A_{70}$:

$$A = x\cos(\omega t + \Theta) \qquad (3)$$
$$= 1/2[X\exp(i\omega t) - X^*\exp(-i\omega t)].$$

A pseudocarrier frequency is related to the bit rate $f_b$ of the rate of rotation of the optical disk by:

$$\omega/2\pi f_b = 1/M, \qquad (4)$$

where M is the number of samples of A encoded on the disk per $2\pi$ rad. The phase and the amplitude of A are encoded on the disk by writing radial stripes, such as radial stripe 252, of length (in bits) given by Eq. (3) to the nearest whole number in super track $A_{70}$.

Figure 9:
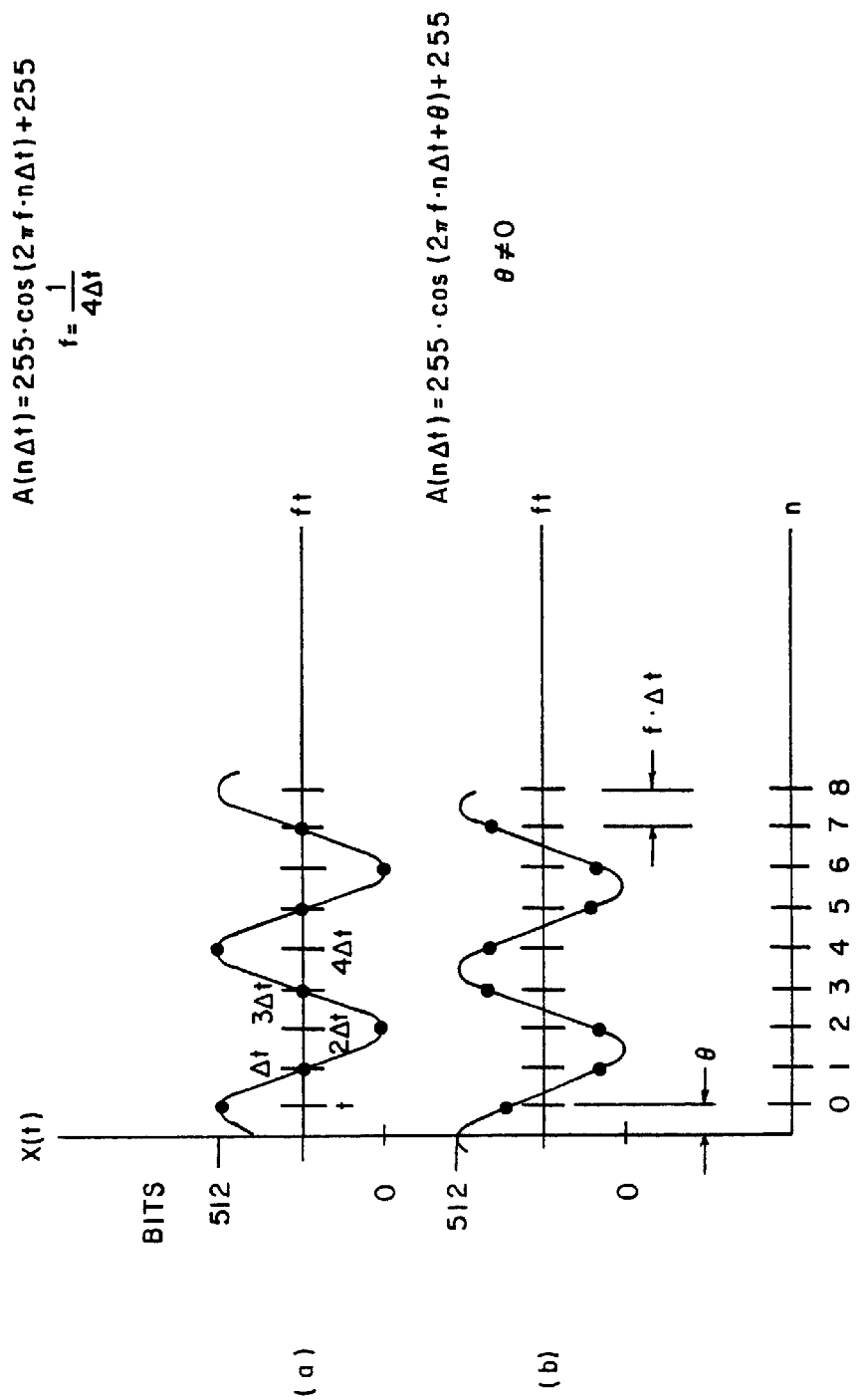
FIG. 9 is a graph illustrating phase encoding in the third embodiment.
Figure 10:
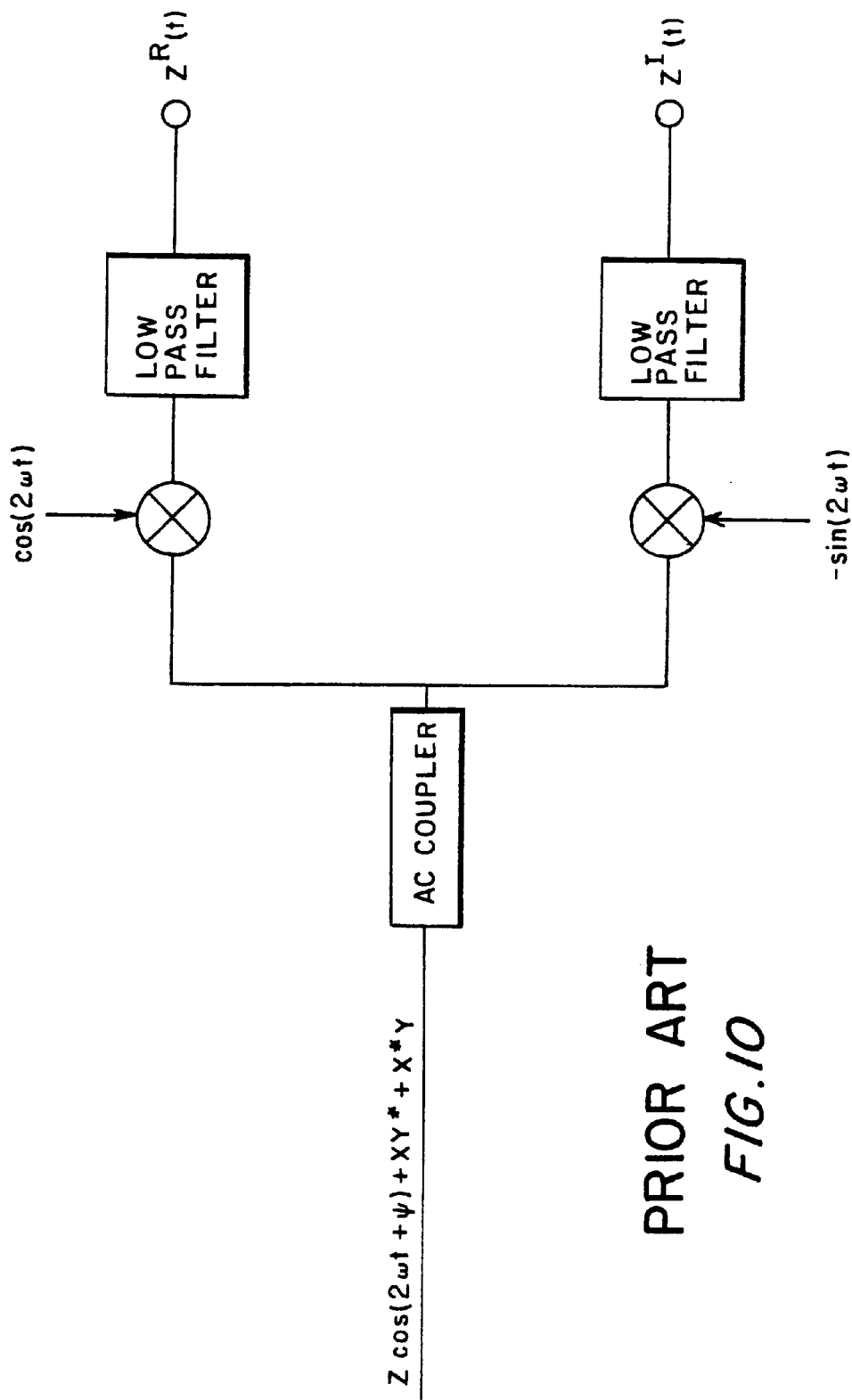
FIG. 10 is a diagram of a conventional quadrature detection circuit.

FIG. 9 shows two plots of the real part A, of a complex signal, on two cycles of a carrier signal. The effective carrier frequency, f, is, for example, $f_b/4$. Equivalently, the carrier period equals four sampling intervals. The phase shift $\Theta$ in FIG. 9(b) is achieved by changes in the amplitude of A at the sampling points as given by the expression for A with $\theta \neq 0$. The numerical quantity written on the disk is the whole number of bits closest to the value of A. With no phase shift, the samples of A consist of radial stripes of bits, such as radial stripe 252, distributed as follows (for 8-bit digital resolution): at $t=0$, 512 bits; at $t=\Delta t$, 256 bits; at $t=2\Delta t$, 0 bits; at $t=3\Delta t$, 256 bits; at $t=4\Delta t$, 512 bits, etc. When A is shifted by a phase angle $\Theta$, the numbers of bits in each stripe are the whole numbers of bits closest to $256 \cos(2\pi f n \Delta t + \Theta) + 256$, with n=0, 1, 2, 3, 4. These plots indicate that a change in phase will cause a change in amplitude and vice versa because the samples are always taken at the same time during the rotation of optical disk 200.

Second, it is necessary to discuss how the amplitude and phase of the external data, for example complex vector Y, is encoded by the laser 205. The laser 205 is modulated acousto-optically or electro-optically by B, the real part of a vector Y having a y component on a carrier $\omega$, B will have the same form as A:

$$B = y\cos(\omega t + \phi) \quad (5a)$$

$$= 1/2[Y\exp(i\omega t) + Y^*\exp(-i\omega t)] \quad (5b)$$

where y and $\phi$ ($\phi = \tan^{-1}(Y^I/Y^R)$) correspond to x and $\theta$ in Eq. (3). The external vector Y must be well synchronized with a disk rotation that is known to be slightly irregular. The rotation speed of optical disk 200 should be tied to the modulator signal rate of spatial modulator 235 by a drive signal to correct for the irregularity. The drive signal to the modulator could be delayed after its rate is sampled to provide time for changing the rotation speed of optical disk 200. Another method synchronizes the modulator signal rate to the optical disk. This can be accomplished by a person of skill in the art with synchronization pulses read from the optical disk. As indicated by FIG. 9 and discussed above, this synchronization is important because a change in phase results in a change in amplitude.

Moreover, the phase of Y is placed on the carrier, as shown explicitly in Eq. (5a). Whereas data on the disk is area modulated, data on the light beam is power modulated. The length of B at the disk is preferably 512 tracks for a bipolar 8-bit correlator. A modulator, such as the Bragg cell previously mentioned, may be chosen with a bandwidth much higher than $\omega$ to effect the modulation.

The inner product of the vector components of vectors X and Y encoded in the reflection beam 255 is $$AB = \frac{1}{4}[XY \exp(i2\omega t) + X^*Y^* \exp(-i2\omega t) + XY^* + X^*Y] \quad (6)$$

We let XY=Z and note that the object of the calculation is to obtain $Z^R$ and $Z^I$, the real and the imaginary parts of Z, respectively. $Z^R$ and $Z^I$ in Eq. (7) below may be extracted from Z by one of the quadrature detection circuits 220. A conventional quadrature detection circuit is shown in FIG. 10. The AC coupler in the circuit (or a high-pass filter that cuts off below the baseband signal frequency) removes the two DC terms in Eq. (6). Equation (6) then becomes (after dropping the two DC terms that do not yield results of interest), $$AB = (\frac{1}{4})[Z^R \sin(2\omega t) - Z^I \sin(2\omega t)]. \quad (7)$$

where $$Z = \sqrt{Z^{R2} + Z^{I2}}, \quad \psi = \Theta + \phi$$

After the real and imaginary parts are extracted by the corresponding one of the quadrature detection circuits, the measuring circuit 280 measures the values of the data products and transmits these values to the computing device 290. The computing device determines which of the super tracks contains the patterns or models having the highest correlation with the input external data.

The advantages and capabilities of the present invention are discussed in more detail in "Highly Parallel Architecture for Optical Disk Database Correlation with Compensation for Database Errors", Applied Optics, Vol. 31, No. 14, May 10, 1992 by the inventors hereof and incorporated by reference herein.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

What is claimed and desired to be secured by Letters Patent of the United States is:

1. An apparatus for parallel readout of patterns stored as data in a plurality of disk tracks on an optical disk, said apparatus comprising:
   a weight and modulated input data beam, encoded with external data and having a trapezoidal shape, and projected onto the optical disk as the optical disk rotates producing a reflection beam encoded with data products of the patterns and the external data; and
   a receiving device, which receives the data products and sums the data products encoded in the reflection beam for each disk track.

2. The apparatus of claim 1, further including:
   a measuring device, coupled to said receiving device, for measuring the accumulated current associated with each pattern; and
   a computing device, coupled to said measuring device, for determining which pattern has the highest correlation with external data.

3. The apparatus of claim 1, further including:
   a sign beam encoded with sign bits associated with the components of the external data which is projected onto the rotating optical disk to produce a sign reflected beam.

4. An apparatus for parallel readout of patterns stored as data on an optical disk, said apparatus comprising:
   a radial modulated input beam, encoded with external data, and projected onto the optical disk as the optical disk rotates producing a reflected beam encoded with data products of the patterns and the external data, and
   a receiving device receiving the reflected beam encoded with the data products.

5. An apparatus for parallel readout and correlation of patterns stored as data on an optical disk having a supertrack, said apparatus comprising:
   a laser beam generator for generating a laser beam;
   a first lens for focusing the laser beam;
   a modulator responsive to the laser beam from the first lens and to the external data for modulating the laser beam as a function of the external data to produce a modulated input data beam;
   a second lens for spreading the modulated input data beam to form a radial beam and projecting the radial beam onto the supertrack of the optical disk, and producing respective data products of each pattern and the external data encoded in a reflected beam; and
   a receiving, array for detecting respective data products of each pattern and external data encoded in the reflected beam and producing respective currents based on the respective data products.

6. The apparatus of claim 5, further including:
   a filtering device responsive to the respective currents from said receiving array for producing real and imaginary components of the respective currents;
   a measuring device, coupled to said receiving device, for measuring the respective currents associated with each pattern; and a computing device, coupled to said measuring device, for determining which pattern has the highest correlation with the external data.

7. A method for parallel readout and correlation of patterns stored as data in supertracks on an optical disk, said method comprising the steps of:

simultaneously multiplying patterns stored in each of the supertracks on the optical disks with external data encoded in a light beam to produce a reflected beam encoded detectincy the data products encoded in the reflected beam for each supertrack.

8. A method for parallel readout and correlation of patterns stored as data in supertracks of an optical disk, said method comprising the steps of:

generating a laser beam;

modulating the laser beam with external data to produce a modulated input data beam;

shaping the modulated input data beam into a radial beam;

projecting the radial beam onto the optical disk to produce data products of the patterns and the external data encoded in the reflected beam; and detecting the data products encoded in the reflected beam for each supertrack.

9. The method of claim 7 further including the steps of:

filtering the DC components from the data products encoded in the reflected beam:

separating the AC components encoded in the reflected beam into a real component and an imaginary component; and calculating which pattern has the highest correlation with the external data.

* * * * *